US006628711B1

United States Patent
Mathew et al.

(10) Patent No.: US 6,628,711 B1
(45) Date of Patent: Sep. 30, 2003

(54) METHOD AND APPARATUS FOR COMPENSATING FOR JITTER IN A DIGITAL VIDEO IMAGE

(75) Inventors: Reji Mathew, Riverwood (AU); Xing Zhang, Menai (AU)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/347,082

(22) Filed: Jul. 2, 1999

(51) Int. Cl.$^7$ .......................... H04N 7/12; H04N 11/04; H04N 11/07
(52) U.S. Cl. ........................... 375/240.12; 348/208.6; 348/208.4; 348/208.3; 348/208.99
(58) Field of Search .................. 375/240.16, 240.12; 348/208.99, 208.13, 208.6, 208.4

(56) References Cited

U.S. PATENT DOCUMENTS 5,497,191 A * 3/1996 Yoo et al. ................ 348/208.6
5,886,744 A * 3/1999 Hannah ................. 375/240.16
5,905,848 A * 5/1999 Yano et al. ................ 386/117
5,926,212 A * 7/1999 Kondo ................. 348/207.99
6,342,918 B1 * 1/2002 Inou et al. ................ 348/208.1
6,424,372 B1 * 7/2002 Kaneda et al. ......... 348/207.99

* cited by examiner

Primary Examiner—Chris Kelley
Assistant Examiner—Charles E Parsons
(74) Attorney, Agent, or Firm—Kenneth A. Haas

(57) ABSTRACT

Apparatus (10) for compensating for jitter in a digital image forming part of a video sequence of such digital images includes a first motion estimation unit (13) having an input for receiving sensed image data and an output for providing a first plurality of motion vectors, each corresponding to one of a plurality of image blocks making up the digital image. A jitter estimation unit (14) determines a jitter vector from the first plurality of motion vectors for the digital image and a jitter compensation unit (15) adjusts the digital image using the jitter vector to compensate for jitter in the digital image. A second motion estimation unit (16) provides a second plurality of motion vectors, each corresponding to one of a plurality of image blocks making up the jitter compensated digital image. The second plurality of motion vectors are determined by utilizing the first plurality of motion vectors and the jitter vector. The second plurality of motion vectors can be used in coding the jitter compensated image for storage and/or onward transmission.

16 Claims, 3 Drawing Sheets

METHOD AND APPARATUS FOR COMPENSATING FOR JITTER IN A DIGITAL VIDEO IMAGE

FIELD OF THE INVENTION

This invention relates to a method and apparatus for compensating for jitter in a digital video image, especially when the digital video image is to be encoded for storage and/or onward transmission so as to produce a stabilized digital video image. In particular, the invention relates to compensating for jitter caused by, for example, a person holding a video camera in their hand(s) when recording the video images.

BACKGROUND OF THE INVENTION

When a person holds a video camera in their hands during recording of digital video images, jitter usually occurs due to the fact that the hands cannot hold the camera very steady. To achieve effective stabilization accurate estimation of the jitter motion is required. Jitter estimation is a difficult problem, because hand shaking, camera panning, zooming and actual motion of the objects can exist concurrently while video images are captured. As a result, most digital stabilizers are designed with a jitter estimation unit which is essentially used to separate the jitter motion from other motion.

The known techniques used for jitter estimation are usually based on fuzzy logic with a large set of heuristic rules. To make reliable decisions data averaging over 5–10 images (frames) is widely used. While image stabilization can thus be achieved, such a design restricts the performance of a digital stabilizer because of the long latency. Moreover, the use of fuzzy logic algorithms introduces complexity for hardware design.

Digital image stabilizers used to compensate camera (hand) shaking (or jitter motion) are standard components of many current analog video camcorders because, once images are recorded on a video tape, there is no way to change them without digitization. As a result, image stabilization has to be performed during recording. However, with digital video cameras, image stabilization does not have to be performed during the capturing process. For digital video, images captured are compressed during recording. Before the recorded video can be viewed, a decoding process has to be performed. Therefore, image stabilization can be done either during the encoding process, at the video camcorder, or during decoding, at the video viewing end, or, indeed, at any stage in between.

In this specification, including the claims, the terms "comprises", "comprising" or similar terms are intended to mean a non-exclusive inclusion, such that a method or apparatus that comprises a list of elements does not include those elements solely, but may well include other elements not listed.

BRIEF SUMMARY OF THE INVENTION

The present invention therefore seeks to provide a method and apparatus for compensating for jitter in a digital image forming part of a video sequence of such digital images which overcome, or at least reduce the above-mentioned problems of the prior art.

Accordingly, in a first aspect, the invention provides a method of compensating for jitter in a digital image forming part of a video sequence of such digital images, the method comprising the steps of providing a plurality of motion vectors each corresponding to one of a plurality of image blocks making up the digital image, wherein the step of providing a plurality of motion vectors includes the steps of, for each of the plurality of image blocks: determining a corresponding best matching image block in the previous digital image; determining a displacement value between the location of the image block in the digital image and the location of the corresponding best matching image block in the previous digital image; and utilizing the displacement value for the image block to determine an initial motion vector for that image block, determining a jitter vector from the plurality of motion vectors for the digital image and from a second plurality of motion vectors provided for a previous digital image in the video sequence, wherein the step of determining a jitter vector utilizes the initial motion vectors to determine the jitter vector; and adjusting the digital image using the jitter vector to compensate for jitter in the digital image to produce a jitter compensated digital image.

In a preferred embodiment, the step of providing a plurality of motion vectors further includes the steps of, for each of image block in the jitter compensated digital image determining a corresponding best matching image block in the digital image; and utilizing the initial motion vector for the corresponding best matching image block and the jitter vector to determine a jitter-compensated motion vector for the image block in the jitter compensated digital image, wherein the jitter-compensated motion vectors form the plurality of motion vectors.

According to a second aspect, the invention provides apparatus for compensating for jitter in a digital image forming part of a video sequence of such digital images, the apparatus comprising a motion estimation unit having an input for receiving sensed image data and an output for providing the plurality of motion vectors, each corresponding to one of a plurality of image blocks making up the digital image; a jitter estimation unit coupled to the motion estimation unit for determining a jitter vector from the plurality of motion vectors for the digital image and from a second plurality of motion vectors provided for a previous digital image in the video sequence, the jitter estimation unit comprising: an input terminal for receiving the plurality of motion vectors; a motion vector integrator having an input coupled to the input terminal and an output, the motion vector integrator generating a motion vector histogram of the frequency of motion vector values at the output thereof; a histogram analyzer having a first input coupled to the output of the motion vector integrator and a second input coupled to an output of a buffer having stored therein the motion vector histogram for a previous digital image, the histogram analyzer correlating the two motion vector histograms to determine a maximum correlation value, which is utilized by the jitter estimation unit to provide the jitter vector; and adjusting means coupled to the jitter estimation unit for adjusting the digital image using the jitter vector to compensate for jitter in the digital image to produce a jitter compensated digital image.

BRIEF DESCRIPTION OF THE DRAWINGS

Several embodiments of the invention will now be more fully described, by way of example, with reference to the drawings, of which.

DETAILED DESCRIPTION OF THE DRAWINGS

Figure 1:
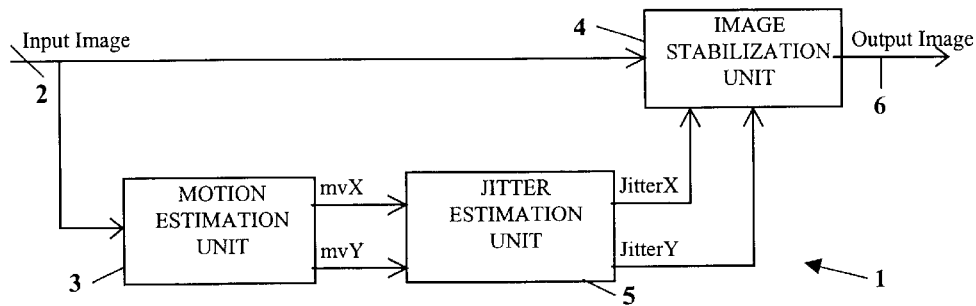
FIG. 1 shows a general schematic block diagram of a digital image stabilizer for use in video camcorders.

Thus, FIG. 1 shows a block diagram of a digital image stabilizer 1 commonly used in video camcorders. An input image, for example as received at a pixel array if it is a digital video camcorder, or after digitization if it is an analog video camcaorder, is received at an input 2 of the digital image stabilizer 1 and then passed to a motion estimation unit 3, as well as to an image stabilization unit 4. The motion estimation unit 3 subdivides the input image into image blocks and estimates motion vectors consisting of projections of motion in each of two orthogonal directions for each block according to a predetermined algorithm. To achieve accurate motion estimation image binarization and full search algorithms are usually used, as further described in our patent application Ser. No. 09/346,816.

After motion estimation, the motion estimation unit 3 passes a set of motion vectors (Motion Vector Map) to the jitter estimation unit 5. Each motion vector is made up of two orthogonal components, one component in an x-direction and one component in a y-direction. In FIG. 1, the motion vector components in the x-direction and y-direction are referred to as mvX and mvY, respectively. It should be noticed that the motion vectors in the Motion Vector Map represent motion due to a combination of jitter, panning, zooming and local motion of moving objects in the image. As described in our patent application Ser. No. 09/346,816 the jitter estimation unit 5 generates one histogram of the frequencies of occurrence of motion vectors having particular values for each of the two orthogonal directions. By analyzing the correlation of histograms for consecutive images, jitter estimation unit 5 is able to detect and estimate the jitter motion. Accurate jitter estimation is finally achieved by an offsetting operation to remove the influence of panning. The outputs from jitter estimation unit 5 are jitter vectors consisting of projections of the motion in two orthogonal directions caused only by jitter which represents the global motion of an image sequence. The two orthogonal components of jitter vectors, one component in the x-direction and the other in the y-direction are represented in FIG. 1 by JitterX and JitterY respectively.

The jitter vectors JitterX and JitterY are then passed to the image stabilization unit 4, which uses this information to compensate for the jitter motion using any appropriate method, again, as further described in our patent application Ser. No. 09/346,816. Consequently, the output image from the image stabilization unit 4 provided at an output 6 of the digital image stabilizer 1 is a stabilized image.

Figure 2:
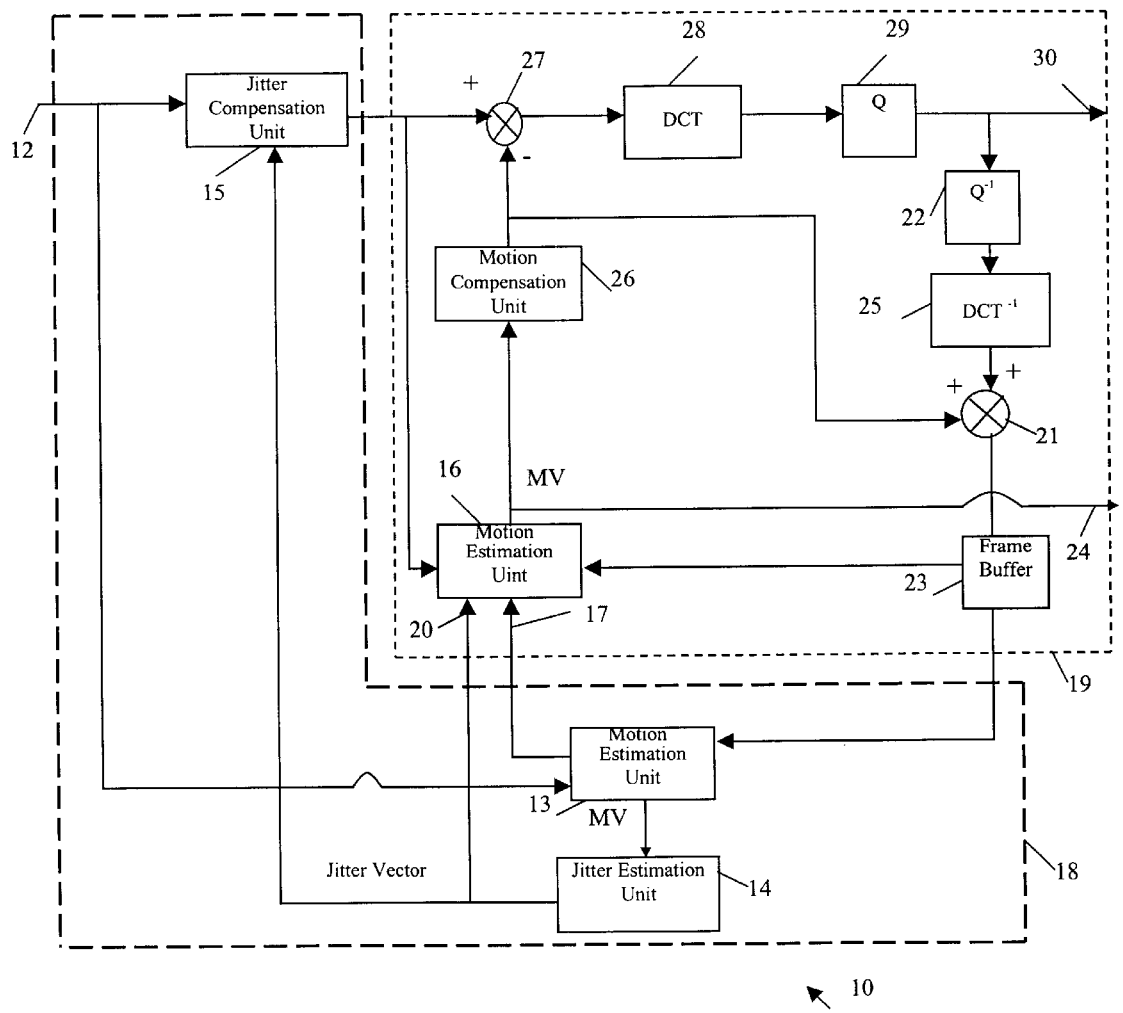
FIG. 2 shows a Discrete Cosine Transform (DCT) based video encoder incorporating a digital image stabilizer.

FIG. 2 shows an integrated design of a video encoder 10 having a jitter compensation module 18, whose output is coded by a coding module 19 in the video encoder 10. As shown in FIG. 2, the jitter compensation module 18 has the same functionality as the digital image stabilizer 1 of FIG. 1.

Thus, in the video encoder 10, an input image is received at an input 12 and made available to a motion estimation unit 13 which performs a first stage of motion estimation, similarly to the motion estimation unit 3 of FIG. 1. The motion estimation unit 13 performs block-based motion estimation, which involves first sub-dividing the received input image into non-overlapping blocks. For each block in the current image, a search is conducted in a previous image for the best matching block. A frame buffer 23, which is part of the coding module 19, has the previous image stored. The difference in co-ordinates between a block in the current image and corresponding best matching block in the previous image is referred to as a Motion Vector (MV). The MV for each block is a representation of motion that has occurred from the previous image to the current image. As described above, each MV has two components, one component in the horizontal direction (referred to as the x-direction) and one component in the vertical direction (referred to as the y-direction). The motion estimation unit 13 performs the motion estimation and produces Motion Vectors for each block in the current image.

An output of the motion estimation unit 13 is then passed to a jitter estimation unit 14, similar to the jitter estimation unit 5 of FIG. 1. The jitter estimation unit 14 uses the Motion Vectors to calculate the amount of jitter in the current image. The jitter estimation unit 14 produces a Jitter Vector which is made available to a jitter compensation unit 15, similar to the image stabilization unit 4 of FIG. 1. This Jitter Vector represents the amount of displacement that has occurred due to jitter or hand shaking. As before, the Jitter Vector is made up of two components, one horizontal component (x-direction) and one vertical component (y-direction). The jitter compensation unit 15 also receives the input image from the input 12 and compensates for jitter in the current image according to the received Jitter Vector from the jitter estimation unit 14. To compensate for the jitter, the jitter compensation unit 15 crops a smaller image from the larger input image. The position at which the smaller image is cropped from the larger input image, is determined by the Jitter Vector received from the jitter estimation unit 14. The output of the jitter compensation unit 15 is a jitter compensated, stable image and becomes an input image to the encoding module 19, where it passes through the various stages of coding as will be further described below.

Since the jitter compensated image is a shifted version of the initial input image, the motion vectors obtained based on the initial image by the motion estimation unit 13 are not useful for video coding. Therefore, motion estimation needs to be performed again. It will be appreciated that although jitter estimation calculates the global motion between frames, for efficient video coding, local motion for blocks need to be determined. Consequently, motion estimation needs to be performed again on the jitter compensated image.

Thus, the jitter compensated image from the jitter compensation unit 15 is made available to a second motion estimation unit 16, in the coding module 19, to perform a second motion estimation and produce a new set of MVs. The second motion estimation unit 16 makes use of the MVs obtained from the first motion estimation unit 13 and the Jitter Vector produced by the jitter estimation unit 14. Thus, the first motion estimation unit 13 provides the MVs at an input 17 to the second motion estimation unit 16 and the jitter estimation unit 14 provides the Jitter Vector at an input 20 to the second motion estimation unit 16. The motion estimation process is generally computationally expensive. Therefore, by taking advantage of the MVs available from the first stage of motion estimation the complexity of the second stage of motion estimation can be dramatically reduced.

The process of video coding after the second stage of motion estimation is not affected by the jitter compensation module 18. FIG. 2 shows an example of the typical stages that follow motion estimation in a video encoder.

The MVs produced by the second motion estimation unit 16 are included, at output 24, as part of the coded output bit stream of the video sequence. The new set of Motion Vectors from the motion estimation unit 16 are also made available to a motion compensation unit 26. The motion compensation unit 26 rearranges the previous image according to the calculated Motion Vectors. This motion compensated image, at the output of the motion compensation unit 26, is then subtracted from the jitter compensated image provided by the jitter compensation unit 15 at a subtraction stage 27 to produce a difference image. The difference image is then transformed using a Discrete Cosine Transform (DCT) in a discrete cosine transformer 28 and then quantized in a quantizer 29 producing quantization coefficients. The quantization coefficients are then coded into binary data to form part of the output bit stream for the sequence at output 30. The video encoder then proceeds to decode the image by employing inverse quantization at an inverse quantizer 22 and inverse DCT at an inverse discrete cosine transformer 25. The resulting data after the inverse DCT operation is then added, at adder 21 in FIG. 2, to the output of the motion compensation unit 26. The resulting image is the decoded image with is stored in frame buffer 23. The contents of the frame buffer 23 are used in the coding of the next input image.

As mentioned above, motion estimation is computationally expensive and performing motion estimation twice in a video encoder would add to both the complexity and the cost of implementation. To achieve high efficiency in both image stabilization and image compression, the encoder can, however, use a hierarchical scheme for motion estimation where MVs from the first motion estimation unit 13 and the Jitter Vector from the jitter estimation unit 14 are used in the second motion estimation unit 16. For such an implementation, the motion estimation of the video encoder needs to be modified from the previous known techniques. In FIG. 2, the second motion estimation unit 16 is coupled to take advantage of the MVs from the first motion estimation 13. No other parts of the video encoder 19 are affected by this hierarchical motion estimation implementation. The video encoder therefore can be of any type as long as it uses block based motion compensation.

This integration of the first motion estimation unit 13 (which is part of the jitter compensation module 18) and the second motion estimation unit 16 (which is part of the video coding module 19) is important. In known systems, the jitter compensation process is implemented as a pre-processing step independent of the video encoder. In the present implementation, however, as illustrated in FIG. 2, the MVs and the Jitter Vector obtained from the jitter compensation process are used to simplify the motion estimation stage of the video encoding process. By using information obtained from the jitter compensation module 18, the complexity of the video encoder 10 is greatly reduced.

As explained earlier, to perform jitter compensation, the jitter compensation unit 15 crops a smaller image out of a larger input image. In the following explanation, as an example, it has been assumed that the coded image is a Common Input Format (CIF) size image, having dimensions 352 pixels wide by 288 pixels high, while the initial input image provided at input 12 in FIG. 2 is 20% larger than a CIF image in both the horizontal (width) and vertical (height) dimensions.

Figure 4:
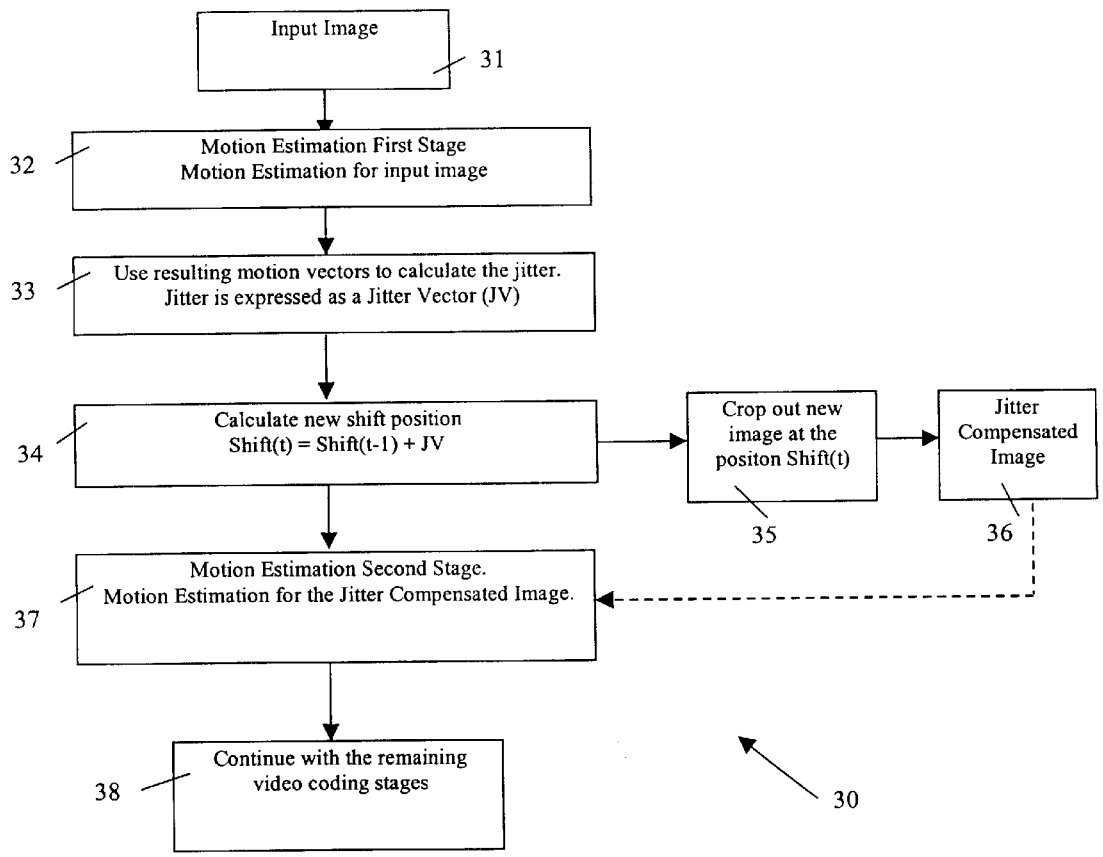
FIG. 4 shows a flow chart illustrating the steps involved in performing jitter compensation with video encoding

The steps involved in performing jitter compensation with video encoding are explained below, with reference to the flow chart 30 in FIG. 4. Firstly, as shown in FIG. 4, an input image is received, as indicated at step 31. Next, motion estimation is performed based on the input image and a previous image, as indicated at step 32. Motion estimation, as explained previously, performs block matching and produces a set of Motion Vectors. These motion vectors are then used to calculate the level of jitter (step 33 in FIG. 4) that has occurred from the previous image to the current input image. The level of jitter contained in the image can be calculated (at step 33) using a variety of methods, including, for example, the Histogram Matching method described in our patent application Ser. No. 09/346,816. The calculated jitter is represented as a Jitter Vector (JV), which has two components, one component in the x-direction and another component in the y-direction. The JV calculated for the current input image (at step 33) is then used (as indicated at step 34) to calculate a new crop position at time t, Shift(t). The equation to calculate the new shift position is given by:

$$\text{Shift}(t) = \text{Shift}(t-1) + JV$$

Figure 3:
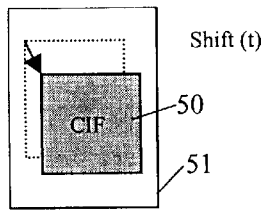
FIG. 3 shows an example of a CIF size image being cropped out of a larger input image.

A CIF image is then cropped out of the larger input image at a position calculated by using the Jitter Vector (as indicated at step 35). FIG. 3 shows an example of a CIF size image 50 being cropped out of a larger input image 51. The position of the cropped CIF size image, in the larger input image is referred to as Shift(t). The resulting image is the jitter compensated image, which is provided (at step 36) as an output to video coding module 19. To proceed with the coding of the jitter compensated image, motion estimation needs to be performed on the jitter compensated image and this is referred to as the second stage motion estimation, as indicated at step 37. After the second stage motion estimation step 37, a standard video coding technique can be employed, as indicated at step 38, to code the jitter compensated image.

Figure 7:
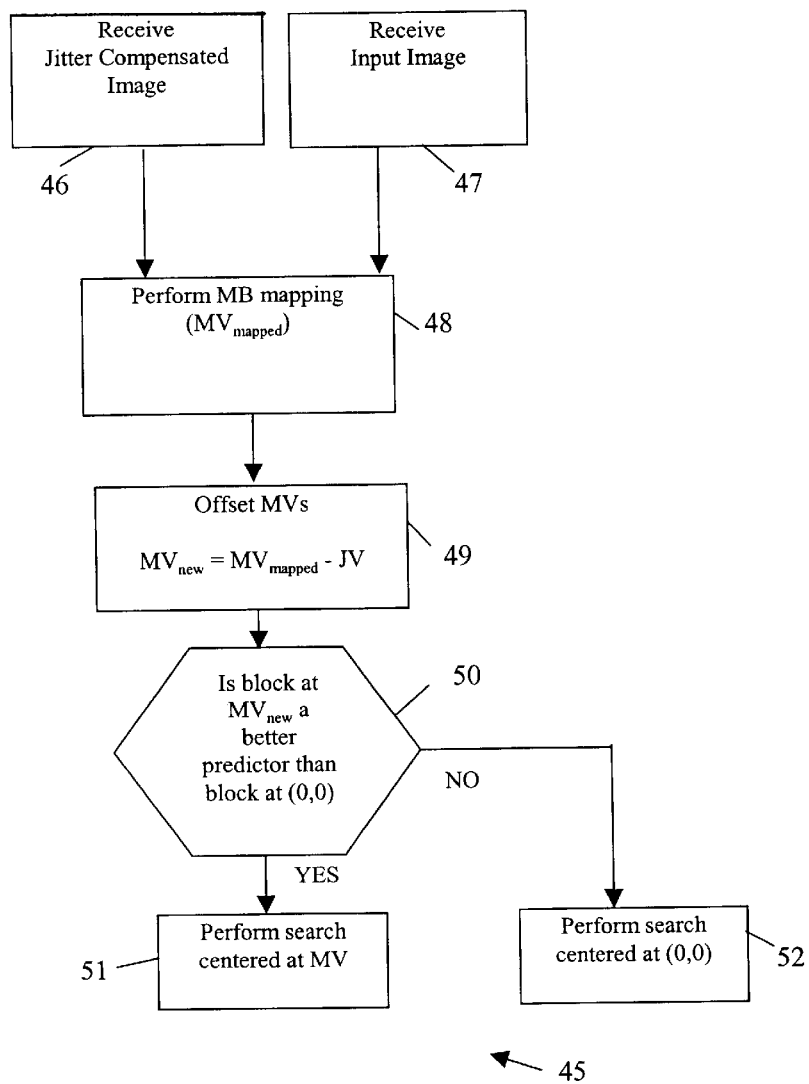
FIG. 7 shows a flow chart illustrating in more detail the steps involved in the second stage motion estimation step of the flow chart of FIG. 4.

The second stage motion estimation step 37 is performed using a hierarchical motion estimation scheme where the second motion estimation unit 16 uses the MVs obtained from the first motion estimation unit 13 as well as the Jitter Vector produced by jitter estimation unit 14 in FIG. 2. This is shown in more detail in the flow chart 45 of FIG. 7. The first procedure 48 to be performed for the second stage motion estimation step is block mapping. For each block of the jitter compensated image provided at step 46, a block from the input image, provided at step 47, that has the greatest amount of overlap is found. In this way, every block in the jitter compensated image provided at step 46 is mapped to a block in the input image (at 47) by the second stage of motion estimation at step 48. Thus the MV for each block in the image provided at step 46 is made equal to the MV of the corresponding mapped block. The next procedure to be performed at step 49 is to offset each MV by the Jitter Vector;

$$MV_{new} = MV_{mapped} - JV$$

For each block of the jitter compensated image provided at step 46, a new MV ($MV_{new}$) is calculated by offsetting the MV obtained from the block mapping process ($MV_{mapped}$) by the Jitter Vector (JV) produced at step 33 in FIG. 4.

Figure 5:
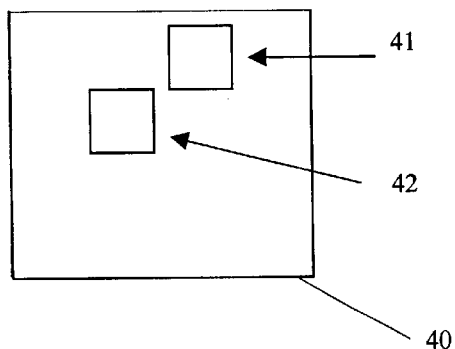
FIGS. 5 and 6 show various stages in the jitter compensating technique of FIG. 4.
Figure 6:
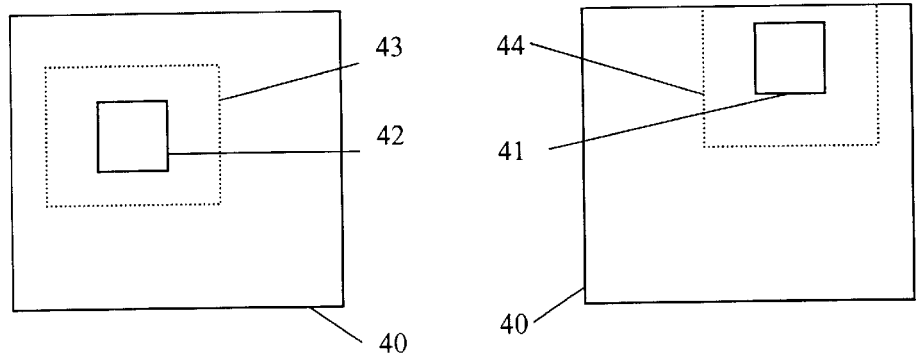

In the next stage 50 of the second stage motion estimation, two predictors are considered. This is illustrated in FIG. 5, which shows a first image block 41 in the reference (or previous) image 40 corresponding to the new offset MV value ($MV_{new}$) and a second image block 42 in the reference (or previous) image corresponding to a MV of zero (ie MV=(0,0)). For each block in the jitter compensated image, block matching is performed to determine which of the two candidate blocks provides a better match. The best prediction can be chosen by calculating a block matching metric such as the sum of absolute differences (SOAD). The candidate with the lowest SOAD is chosen as the best predictor. If the best prediction is provided by the first image block 41 at $MV_{new}$, then in a search stage 51, a limited search is conducted in the reference or previous frame centered about the first image block 41 at $MV_{new}$. If, on the other hand, the best prediction is provided by the second image block 42 at the (0,0) position, then in a search stage 52, a limited search is conducted in the reference or previous frame centered about the second image block 42 at the (0,0) position. This is illustrated in FIG. 6, where the left-hand drawing shows a search area 43 centred on the second image block 42 in the reference image 40 for the case where the second image block 42 at the (0,0) position provided the better predictor, and the right-hand drawing shows a search area 44 centred on the first image block 41 at $MV_{new}$ in the reference image 40 for the case where the first image block 41 provided the better predictor. A full search within a window of +/- 8 from the best predictor location can be used.

After carrying out this search and locating the best matching block in the searched region, the remaining stages of a typical video coding algorithm indicated at step 38 in FIG. 4 can be completed. That is, after the second stage motion estimation, the remaining stages of video coding need not in any way be changed due to the presence of jitter compensation.

It will thus be appreciated that the integration of digital image stabilization with video coding, as described above allows an increase in compression efficiency of the encoder. As a result, minimal computation is required to achieve image stabilization, there is an increase in coding efficiency, the stabilizer can be a separate module, which can be connected and disconnected easily and there is a reduction in computational complexity. Furthermore, the design can be applied to any video encoder using a block based motion estimation technique.

It will be appreciated that although one particular embodiment of the invention have been described in detail, various modifications and improvements can be made by a person skilled in the art without departing from the scope of the present invention.

What is claimed is:

1. A method of compensating for jitter in a digital image forming part of a video sequence of such digital images, the method comprising the steps of:

providing a first plurality of motion vectors each corresponding to one of a plurality of image blocks making up the digital image, determining a jitter vector from the first plurality of motion vectors for the digital image and from a second plurality of motion vectors provided for a previous digital image in the video sequence;

adjusting the digital image using the jitter vector to compensate for jitter in the digital image to produce a jitter compensated digital image;

providing a second plurality of motion vectors including the steps of, for each image block in the jitter compensated digital image, determining a corresponding best matching image block in the digital image; and utilizing the motion vector from the first plurality of motion vectors for the corresponding best matching image block and the jitter vector to determine a jitter-compensated motion vector for the image block in the jitter compensated digital image.

2. A method of compensating for jitter in a digital image according to claim 1, wherein the step of providing a first plurality of motion vectors includes the steps of, for each of the plurality of image blocks:

determining a corresponding best matching image block in the previous digital image;

determining a displacement value between the location of the image block in the digital image and the location of the corresponding best matching image block in the previous digital image; and utilizing the displacement value for the image block to determine a motion vector for that image block.

3. A method of compensating for jitter in a digital image according to claim 1, wherein the step of determining a jitter vector utilizes a plurality of motion vectors for at least one previous digital image.

4. A method of compensating for jitter in a digital image according to claim 1, wherein the step of determining a jitter vector utilizes a plurality of motion vectors for at least one subsequent digital image.

5. A method of compensating for jitter in a digital image according to claim 1, wherein the plurality of motion vectors relate to at least one component of jitter.

6. A method of compensating for jitter in a digital image according to claim 1, wherein the steps of providing a plurality of motion vectors, determining a jitter vector and adjusting the digital image are carried out for at least two separate components of jitter.

7. A method of compensating for jitter in a digital image according to claim 1, wherein the digital image is received from an image sensing device.

8. A method of compensating for jitter in a digital image according to claim 7, wherein the received digital image is corrected using the jitter vectors.

9. A method of compensating for jitter in a digital image according to claim 8, wherein the motion vectors are encoded for at least one of storage and onward transmission.

10. A method of compensating for jitter in a digital image according to claim 8, wherein the step of adjusting the digital image includes the step of:

cropping a received digital image to produce a smaller digital image where the location of the smaller digital image within the received digital image is dependent on the jitter vector.

11. A method of compensating for jitter in a digital image according to claim 10, further comprising the step of upsampling the smaller digital image to produce a digital image of a desired size.

12. Apparatus for compensating for jitter in a digital image forming part of a video sequence of such digital images, the apparatus comprising:

a first motion estimation unit having an input for receiving sensed image data and an output for providing a first plurality of motion vectors, each corresponding to one of a plurality of image blocks making up the digital image;

a jitter estimation unit coupled to the first motion estimation unit for determining a jitter vector from the first plurality of motion vectors for the digital image;

a jitter compensation unit coupled to the jitter estimation unit for adjusting the digital image using the jitter vector to compensate for jitter in the digital image to produce a jitter compensated digital image;

a second motion estimation unit having a first input coupled to the first motion estimating unit for receiving the first plurality of motion vectors, a second input coupled to the jitter estimation unit for receiving the jitter vector and a third input coupled to the jitter compensating unit for receiving the jitter compensated digital image, the second motion estimation unit having an output for providing a second plurality of motion vectors, each corresponding to one of a plurality of image blocks making up the jitter compensated digital image.

13. Apparatus for compensating for jitter in a digital image according to claim 12, further comprising a motion compensation unit coupled to the second motion estimation unit for adjusting the jitter compensated digital image according to the second plurality of motion vectors to provide a motion compensated digital image.

14. Apparatus for compensating for jitter in a digital image according to claim 13, further comprising a comparator device coupled to the motion compensation unit and to the jitter compensation unit for comparing the jitter compensated digital image with the motion compensated digital image to provide a difference image.

15. Apparatus for compensating for jitter in a digital image according to claim 14, further comprising an encoding device coupled to the comparator device for encoding the difference image, the apparatus having a first output providing an encoded digital image.

16. Apparatus for compensating for jitter in a digital image according to claim 15, wherein the apparatus has a second output coupled to the output of the second motion estimation unit providing the second plurality of motion vectors.

* * * * *